United States Patent [19]
Dahl et al.

[11] 3,739,494
[45] June 19, 1973

[54] DISCHARGING DEVICE FOR CONTAINERS IN WHICH PARTICULATE MATERIAL IS TREATED WITH GASES IN COUNTER-CURRENT FLOW

[75] Inventors: Erik Qvale Dahl; Ole Hustvedt, both of Kristiansand S., Norway

[73] Assignee: Elkem A/S, Oslo, Norway

[22] Filed: Aug. 17, 1971

[21] Appl. No.: 172,494

[52] U.S. Cl............................ 34/174, 34/218, 34/239
[51] Int. Cl............................................. F26b 17/12
[58] Field of Search............................34/64–66, 174, 201, 203, 216, 218, 230–233, 239, 172

[56] References Cited
UNITED STATES PATENTS

| | | | |
|---|---|---|---|
| 3,406,463 | 10/1968 | Andersen | 34/174 |
| 3,159,467 | 12/1964 | Pender | 34/174 |
| 2,849,806 | 9/1958 | Grahek | 34/174 |
| 3,199,215 | 8/1965 | Jesse et al. | 34/174 |
| 3,634,949 | 1/1972 | Louks | 34/174 |
| 3,279,094 | 10/1966 | Blanton | 34/233 |

Primary Examiner—Kenneth W. Sprague
Assistant Examiner—James C. Yeung
Attorney—William D. Lucas and Eyre, Mann & Lucas

[57] ABSTRACT

A discharge device for containers in which lumpy material or agglomerated bodies are treated with gases in counter-current flow is disclosed. The device comprises a holding chamber comprising trap door in spatial relation to openings in the bottom of the discharge apparatus and chains as sidewalls of the holding chamber.

3 Claims, 2 Drawing Figures

PATENTED JUN 19 1973 3,739,494

DISCHARGING DEVICE FOR CONTAINERS IN WHICH PARTICULATE MATERIAL IS TREATED WITH GASES IN COUNTER-CURRENT FLOW

The present invention relates to a new and useful discharging device for the treatment of particulate material such as lumpy material or agglomerated bodies where the treatment comprises passing gases in counter-current flow through the lumpy material or agglomerated bodies. The device is especially useful for drying of raw (green) pellets.

Raw and semi-dried pellets are mechanically weak and it is therefore difficult to treat them with gases in countercurrent flow such as in drying operations. The primary problem is that the pellets may not be packed so heavily that they are crushed by their own weight and there cannot be great agitation which will destroy the pellets. According to the present invention an apparatus is provided which permits counter-current flow of gases through particulate materials without destroying the mechanical structure of the material being treated. The device comprises a discharge with openings in the bottom thereof. A trap door is provided below the openings and is spatially removed from the openings. The trap door is maintained in position during the countercurrent flow of the gases and the trap door is opened to permit discharge of the dried pellets. When in operation, the pellets rest on the flap and against chains which form at least one of the side walls. Gaseous flow can pass through the chains and come in intimate contact with the pellets without any requirement for agitation. In addition, the chains provide a flexible holding chamber which helps to prevent the pellets from becoming adhered to the holding chamber.

These and other advantages of the present invention may be more fully understood with reference to the drawings in which.

Figure 1:
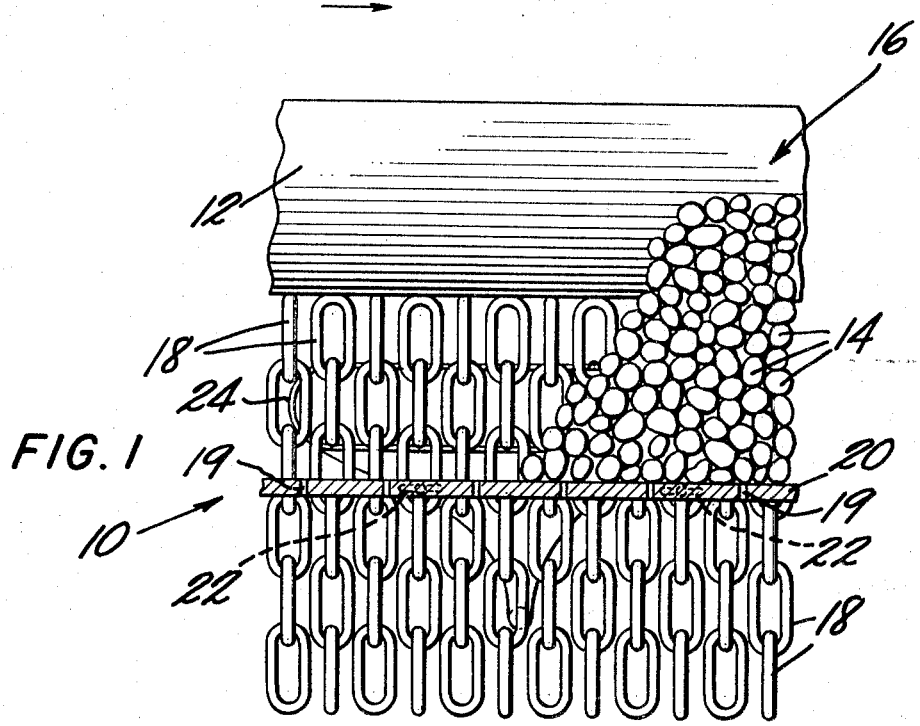
FIG. 1 shows a sectional view along line 1—1 of FIG. 2 of a discharge apparatus made in accordance with the present invention.

Referring specifically to FIG. 1, there is seen a portion of a discharge apparatus shown generally at 10. Cross beams 12 are essentially rib shaped and feed the pellets 14 to the holding chamber 16 and trap door 20 forms the bottom of the said chamber. The chains are preferably link chains as shown, but any type of chain which will permit the flow of gas is acceptable. Where the chain is a link chain, the size of the links in a particular chain may be varied, if desired. Gas may be passed through the chains 18 to treat the pellets 14. In addition, the trap door 20 may be perforated as with holes 19 so that gasses can pass through it. The size and spacing of the chains 18 and any perforations in the trap door 20 should be such that substantially all of the pellets 14 will be maintained within the holding chamber 16.

Figure 2:
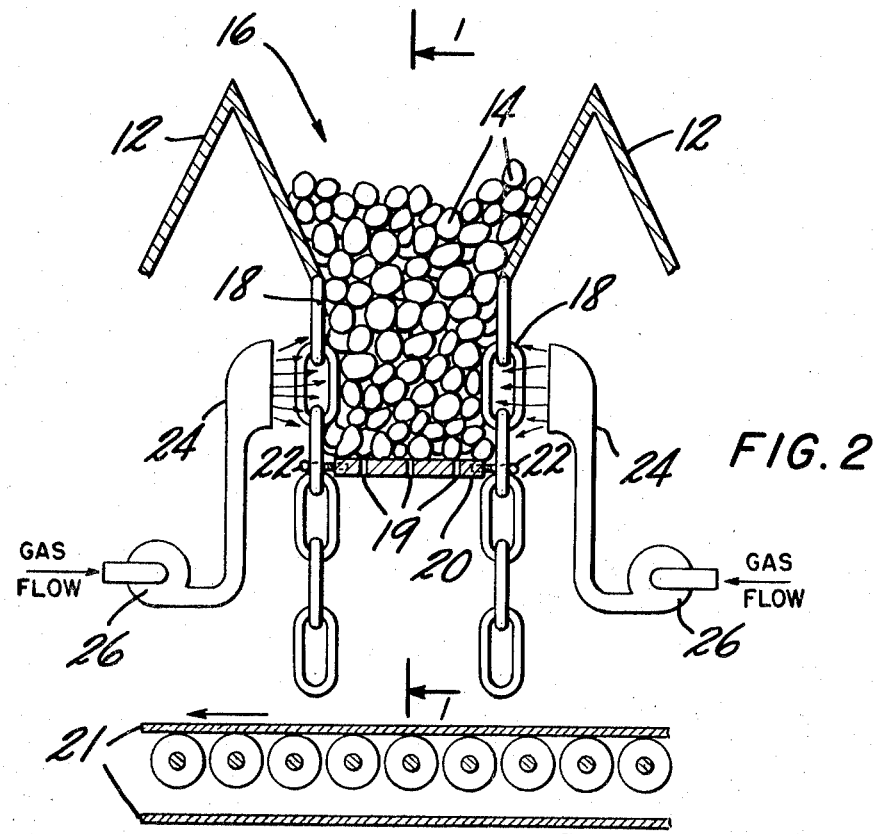
FIG. 2 is a partial end view of a discharge apparatus according to the present invention.

As can be seen more clearly in FIG. 2, the pellets 14 rest on the trap door 20 between two sets of chains 18. The trap door 20 is formed as a segment valve. For discharging, the valve is turned to one side or the other. The discharged material drops into a hopper after the pellets have been treated with the counter-current gaseous flow. The countercurrent gaseous flow may suitably be introduced through the hopper which serves as a wind box. The segment valves may be replaced by any other suitable retaining means which may be manually or automatically released. As shown, the cross beams 12 in the bottom of the discharge apparatus 10 are in the form of ridges which is the preferred embodiment. The cross beams 12 can, however, be in any form which will feed the pellets 14 to the holding chamber 16. The pellets may be introduced into the apparatus by any suitable means such as a conventional spreader. The height of the pellets in the holding chamber should be limited to a height which will not crush the bottom pellets. The device as shown comprises one holding chamber but it is evident that more than one holding chamber can be employed.

While the invention has been described in connection with drying of raw pellets, it will be understood that the apparatus can also be used for drying or other gaseous treatment of many different types of material including the drying of coke, calcination processes, hardening and burning of pellets and the like.

It will further be understood that the claims are intended to cover all changes and modifications of the preferred embodiments of our invention, herein chosen for the purpose of illustration, which do not constitute departures from the spirit and scope of the invention.

What is claimed is:

1. In an apparatus for the treatment of particulate material by counter-current gas flow, the improvement which comprises at least one holding chamber having cross-beams, at least one plurality of chains positioned adjacent one another projecting downwardly below said cross beams, at least one trap door, spatially removed from said cross beams, releasable means for holding said trap door in spatial relation to said cross beams for alternately confining material in said holding chamber and releasing material from said holding chamber, said chains being disposed to confine particulate material in said holding chamber during treatment and said chains being disposed to permit the passage of gas to the particulate material during the treatment with counter-current gas flow.

2. The apparatus of claim 1 further including a belt conveyor for removing particulate material discharged from said holding chamber.

3. The apparatus of chain 1 wherein the trap door is perforated.

* * * * *